United States Patent

Hijiya et al.

[11] Patent Number: 5,848,844
[45] Date of Patent: Dec. 15, 1998

[54] FLUID BEARING

[75] Inventors: Toshinori Hijiya; Hiroyuki Shingai, both of Itabashi-ku, Japan

[73] Assignee: Copal Company Limited, Tokyo, Japan

[21] Appl. No.: 872,805

[22] Filed: Jun. 10, 1997

[30] Foreign Application Priority Data

Jun. 12, 1996 [JP] Japan ................................. 8-150954

[51] Int. Cl.⁶ .................................................. F16C 32/06
[52] U.S. Cl. ........................... 384/114; 384/107; 384/108
[58] Field of Search ................................... 384/100, 114, 384/115, 107, 111, 112, 113

[56] References Cited

U.S. PATENT DOCUMENTS

| | | | |
|---|---|---|---|
| 3,602,555 | 8/1971 | Hendler | 384/115 |
| 4,805,972 | 2/1989 | Tanaka et al. | 384/107 X |
| 5,289,067 | 2/1994 | Tanaka et al. | 384/107 X |
| 5,606,448 | 2/1997 | Suzuki et al. | 384/100 X |

FOREIGN PATENT DOCUMENTS

| | | |
|---|---|---|
| 58-109715 | 6/1983 | Japan . |
| 59-23319 | 2/1984 | Japan . |
| 59-47517 | 3/1984 | Japan . |
| 2536947 | 2/1997 | Japan . |

*Primary Examiner*—Thomas R. Hannon
*Attorney, Agent, or Firm*—Merchant, Gould, Smith, Edell, Welter & Schmidt

[57] ABSTRACT

It is an object of the invention to provide an inexpensive and high-quality fluid bearing which improves the workability in assembly or coupling of a shaft and a rotator. In order to achieve this object, a fluid bearing according to the invention includes a rotating shaft, a bearing member for rotatably supporting the rotating shaft, and first and second fluid film formation mechanisms arranged at positions near a central portion of the rotating shaft along its longitudinal direction. The first fluid film formation mechanism forms a fluid film between the rotating shaft and the bearing member while the rotating shaft rotates in a first direction. The second fluid film formation mechanism forms a fluid film between the rotating shaft and the bearing member while the rotating shaft rotates in a second direction opposite to the first direction.

5 Claims, 2 Drawing Sheets

FLUID BEARING

BACKGROUND OF THE INVENTION

The present invention relates to a fluid bearing used for an axial fan motor, a spindle motor, or the like.

Conventionally, a fluid bearing as disclosed in, e.g., Japanese Patent Laid-Open No. 58-109715 is known, in which the direction of rotation is regulated to one direction, and two radial bearings are formed at necessary positions.

However, this conventional bearing has the following problems.

(1) Since patterned groove portions for forming a fluid film are arranged at a position close to the central portion of the shaft and at a position close to one end portion, respectively, the direction of inserting the shaft into the bearing member for supporting the shaft is limited to one direction.

(2) Although a sufficient bearing function is exhibited while the shaft rotates in one direction, this function is virtually lost during rotation in the opposite direction.

Particularly in reference to the problem in item (1) above, when a rotator such as a rotor is to be coupled to the shaft by insert-molding, the direction of the shaft for fixing the rotator is limited to one direction. In other words, attachment of the shaft to the rotator in a wrong direction makes the bearing member unusable. Since the shaft must be carefully attached in a proper direction, the workability largely degrades.

SUMMARY OF THE INVENTION

The present invention has been made in consideration of the above problem, and has as its object to provide an inexpensive and high-quality fluid bearing which improves the workability in assembly or coupling of a shaft and a rotator.

To solve the above problem and achieve the above object, a fluid bearing according to the present invention is characterized in the following arrangement.

A fluid bearing comprises a rotating shaft, a bearing member for rotatably supporting the rotating shaft, and first and second fluid film formation means arranged at positions near a central portion of the rotating shaft along a longitudinal direction thereof, the first fluid film formation means forming a fluid film between the rotating shaft and the bearing member while the rotating shaft rotates in a first direction, and the second fluid film formation means forming a fluid film between the rotating shaft and the bearing member while the rotating shaft rotates in a second direction opposite to the first direction.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

A preferred embodiment of the present invention will be described below in detail with reference to the accompanying drawings.

Figure 1:
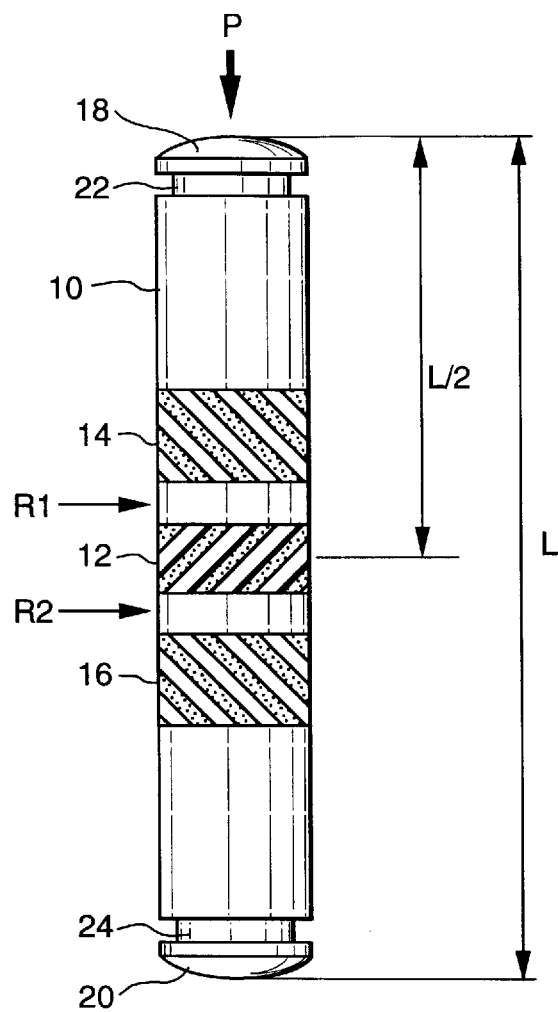
FIG. 1 is a view showing the structure of a shaft used for a bearing according to an embodiment.

FIG. 1 is a view showing the structure of a shaft 10 used for a fluid bearing according to an embodiment.

Referring to FIG. 1, a first patterned groove portion 12 is formed at the central portion (a position L/2 from an end portion) of the shaft 10 which has a total length L along the longitudinal direction to form a fluid film between the shaft 10 and a bearing member 32 (FIG. 2) for supporting the shaft. A second patterned groove portion 14 is formed above the first groove portion 12 in FIG. 1 to be adjacent to it. A third patterned groove portion 16 is formed below the first groove portion 12 in FIG. 1 to be adjacent to it. The pattern direction of the second and third groove portions 14 and 16 is set to be opposite to that of the first groove portion 12. The positions of the second and third groove portions 14 and 16 are nearly symmetrical to each other with respect to the first groove portion 12. Each of end portions 18 and 20 of the shaft 10 is formed into an almost spherical shape. When one of the end faces is received by a support face 37 (FIG. 2), this bearing also functions as a thrust bearing. Grooves 22 and 24 are formed slightly inside at the two end portions of the shaft 10, respectively. These grooves 22 and 24 serve to improve the coupling properties between the shaft 10 and an insert-molded rotator such as a rotor.

The function of the bearing using the shaft 10 with the above structure will be described below.

When the shaft 10 rotates clockwise when viewed from a direction indicated by an arrow P, a lubricating fluid supplied between the shaft 10 and the bearing member 32 is collected at a position R1 by the function of the first and second groove portions 12 and 14, thus forming a fluid film at this position. This fluid film floats the shaft 10 from the bearing member 32, so that the fluid film functions as a bearing. When the shaft 10 rotates counterclockwise when viewed from the direction indicated by the arrow P, the lubricating fluid supplied between the shaft 10 and the bearing member 32 is collected at a position R2 by the function of the first and third groove portions 12 and 16, thus forming a fluid film at this position. This fluid film also floats the shaft 10 from the bearing member 32, so that the fluid film functions as a bearing. The distance between the end portion 18 (or 20) and the position R1 and that between the end portion 18 (or 20) and the position R2 do not exactly equal each other but approximately equal each other. Regardless of the direction of rotation of the shaft 10, i.e., clockwise or counterclockwise, equivalent bearing performance is obtained. With the above structure, a bearing corresponding to a rotating machine which rotates in two directions is provided. This is the first effect of this embodiment.

An effect obtained when the direction of rotation of the shaft 10 is limited to one direction will be described next.

A case wherein a rotator is attached on the side of the end portion 18 of the shaft 10, the side of the end portion 20 is supported on the support face 37, and the bearing is operated as a radial/thrust bearing will be considered. When the shaft 10 is rotated clockwise when viewed from the direction indicated by the arrow P, the fluid supplied between the shaft 10 and the bearing member 32 collects at the position R1, so that a fluid bearing in the radial direction is formed at this position. The lubricating fluid is also supplied to the end portion 20 of the shaft 10 by the function of the third groove portion 16. Since the lubricating fluid spreads to the contact portion between the end portion 20 and the support face 37 in the thrust direction, lubrication in both the radial and thrust directions is enabled.

The shaft 10 is set upside down, the rotator is attached on the side of the end portion 20 of the shaft 10, and the side of the end portion 18 is supported on the support face 37. In this case as well, the same effect as described above can be obtained by rotating the shaft 10 clockwise when viewed from the upper side. More specifically, a fluid bearing in the radial direction is formed at the position R2 by the function of the first and third groove portions 12 and 16, and the fluid is supplied to the contact point between the end portion 18 and the support face 37 by the function of the second groove portion 14. Therefore, lubrication in both the radial and thrust directions is enabled.

When the direction of rotation of the shaft 10 is limited to one direction, lubrication in both the radial and thrust directions is enabled regardless of the rotator attachment position of the shaft 10, i.e., the upper or lower portion of the shaft 10. More specifically, when the rotator is to be insert-molded in the shaft 10, the shaft 10 can be inserted in any direction. This saves labor and time in production and allows to reduce the cost of products. This is the second effect of this embodiment.

In the above description, the shaft 10 is rotated clockwise. However, when the pattern directions of the first to third patterned groove portions are reversed to those shown in FIG. 1, the above embodiment can also cope with counter-clockwise rotation, as a matter of course.

Figure 2:
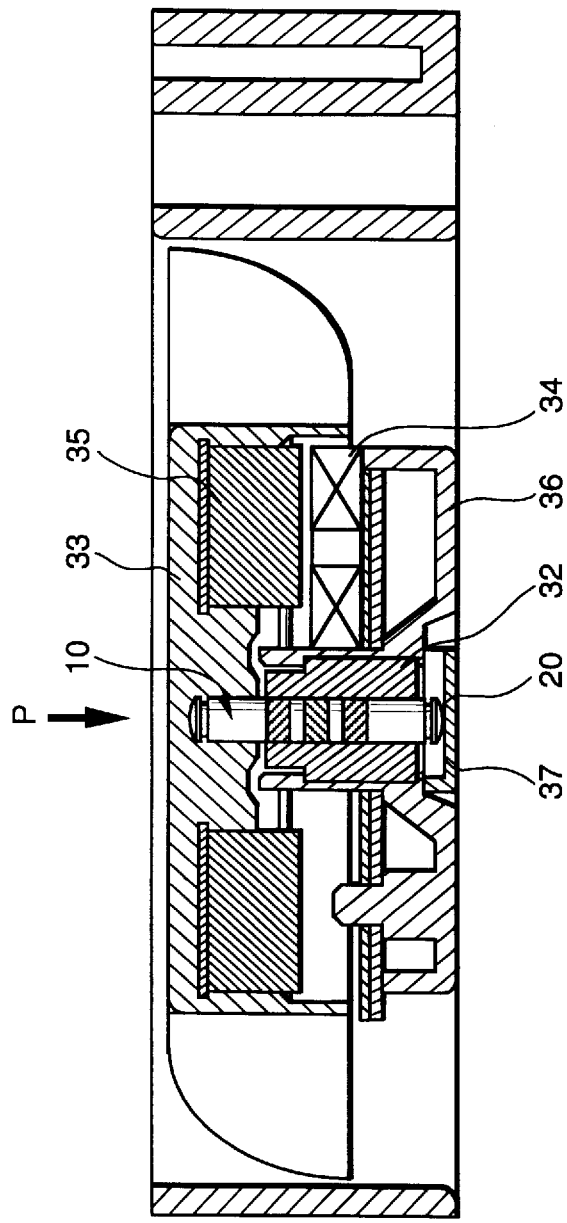
FIG. 2 is a view showing the structure of an axial fan motor which uses the shaft shown in FIG. 1.

FIG. 2 is a view showing an example of application of the fluid bearing to an axial fan motor.

Referring to FIG. 2, reference numeral 10 denotes the shaft used for the fluid bearing which has already been described; 32, the bearing member which forms a fluid bearing in cooperation with the shaft 10; 33, a rotator, i.e., a rotary vane of a fan to which a magnet 35 is fixed with an adhesive or the like; and 34, a coil fixed to a housing 36 as a stator to generate a torque which applies a rotating force to the rotary vane 33. The shaft 10 and the rotary vane 33 are coupled to each other by insert-molding by exploiting the characteristic nature of a plastic as the material of the rotary vane 33. The lower end of the shaft 10 abuts against the support face 37 and is supported in the thrust direction.

When the shaft 10 shown in FIG. 1 is used for the axial fan motor shown in FIG. 2, the positions of the groove portions for forming a radial bearing become the same with respect to the axial support position regardless of the insert direction of the shaft 10 into the rotary vane 33. For this reason, the respective groove portions function in the same way unless the direction of rotation changes.

Since the insert direction is not limited, molding can be easily performed without generating any work errors. In addition, the groove portion close to the lower end portion of the shaft, which does not contribute to form a radial bearing, serves to guide the lubricating fluid to the contact point to the support face 37. For this reason, the frictional resistance of the support portion in the thrust direction can be reduced.

The present invention can be applied to changes and modifications of the above embodiment without departing from the spirit and scope of the invention.

As has been described above, according to the present invention, when the shaft rotates in two directions, a fluid bearing which exhibits equivalent bearing performance regardless of the direction of rotation of the shaft is provided.

When the direction of rotation of the shaft is limited to one direction, the shaft can be inserted into the rotator in any direction, so that the productivity can be improved.

The present invention is not limited to the above embodiments and various changes and modifications can be made within the spirit and scope of the present invention. Therefore, to appraise the public of the scope of the present invention, the following claims are made.

What is claimed is:

1. A fluid bearing comprising:

a rotating shaft;

a bearing member for rotatably supporting said rotating shaft; and first and second fluid film formation means arranged at positions near a central portion of said rotating shaft along a longitudinal direction thereof, said first fluid film formation means forming a fluid film between said rotating shaft and said bearing member while said rotating shaft rotates in a first direction, and said second fluid film formation means forming a fluid film between said rotating shaft and said bearing member while said rotating shaft rotates in a second direction opposite to the first direction, said first fluid film formation means including a first patterned groove portion formed at a substantially central portion of said rotating shaft along the longitudinal direction thereof, and a second groove portion formed on one side of the first groove portion to have a pattern in a direction opposite to that of the first groove portion, said second fluid film formation means including the first groove portion and a third groove portion formed on the other side of the first groove portion to have a pattern in a direction opposite to that of the first groove portion, said rotating shaft having an end portion being formed into a substantially spherical shape with position regulation in a thrust direction being performed by bringing said end portion into contact with a support face.

2. The bearing according to claim 1, wherein the second and third groove portions are formed to be substantially symmetrical to each other with respect to the first groove portion.

3. The bearing according to claim 1, wherein two end portions of said rotating shaft have shapes substantially symmetrical with respect to the central portion of said shaft, a rotator is attached to one end portion of said shaft, and the other end portion is used for position regulation in the thrust direction.

4. The bearing according to claim 1, wherein when said rotating shaft rotates in the first direction, the first and second groove portions form said fluid film, and the third groove portion serves to supply a fluid to an end portion of said shaft.

5. The bearing according to claim 1, wherein when said rotating shaft rotates in the second direction, the first and third groove portions form said fluid film, and the second groove portion serves to supply a fluid to an end portion of said shaft.

* * * * *